United States Patent
Ould et al.

(10) Patent No.: US 10,048,065 B2
(45) Date of Patent: Aug. 14, 2018

(54) METHOD AND APPARATUS FOR MEASURING A PART

(71) Applicant: RENISHAW PLC, Wotton-under-Edge, Gloucestershire (GB)

(72) Inventors: John Charles Ould, Backwell Farleigh (GB); Paul William Moore, Minchinhampton (GB); Matthew Anthony Revell, Cam (GB)

(73) Assignee: RENISHAW PLC, Wotton-Under-Edge (GB)

( * ) Notice: Subject to any disclaimer, the term of this patent is extended or adjusted under 35 U.S.C. 154(b) by 78 days.

(21) Appl. No.: 14/438,138

(22) PCT Filed: Nov. 5, 2013

(86) PCT No.: PCT/GB2013/052884
§ 371 (c)(1),
(2) Date: Apr. 23, 2015

(87) PCT Pub. No.: WO2014/076454
PCT Pub. Date: May 22, 2014

(65) Prior Publication Data
US 2015/0285629 A1    Oct. 8, 2015

Related U.S. Application Data

(60) Provisional application No. 61/726,233, filed on Nov. 14, 2012.

(30) Foreign Application Priority Data

Nov. 14, 2012  (EP) ..................... 12250176

(51) Int. Cl.
*G01B 21/04*   (2006.01)

(52) U.S. Cl.
CPC ........... *G01B 21/04* (2013.01); *G01B 21/047* (2013.01)

(58) Field of Classification Search
CPC ............................ G01B 21/04; G01B 21/047
(Continued)

(56) References Cited

U.S. PATENT DOCUMENTS

| 4,084,323 A | 4/1978 | McMurtry |
| 4,153,998 A | 5/1979 | McMurtry |

(Continued)

FOREIGN PATENT DOCUMENTS

| DE | 4436782 A1 | 4/1995 |
| EP | 0169133 B1 | 1/1989 |

(Continued)

OTHER PUBLICATIONS

Aug. 3, 2015 Office Action issued in Taiwanese Patent Application No. 102141319.

(Continued)

*Primary Examiner* — R. A. Smith
(74) *Attorney, Agent, or Firm* — Oliff PLC

(57) ABSTRACT

A method of inspecting an artifact on a machine tool includes: scanning a probe mounted on the machine tool along the surface of the artifact to be inspected. The method involves supplying a flow of fluid at least at the point of interaction between the probe and the artifact during the scanning.

10 Claims, 4 Drawing Sheets

(58) Field of Classification Search
USPC .......................................................... 33/503
See application file for complete search history.

(56) References Cited

U.S. PATENT DOCUMENTS

| | | | |
|---|---|---|---|
| 4,536,661 A | | 8/1985 | McMurtry |
| 4,561,776 A | * | 12/1985 | Pryor ................... G01B 11/007 356/241.1 |
| 5,095,788 A | | 3/1992 | Matoni |
| 6,154,972 A | | 12/2000 | Otsubo |
| 7,882,723 B2 | * | 2/2011 | Takahama ............ G01B 21/045 73/1.79 |
| 8,464,054 B2 | | 6/2013 | Prestidge et al. |
| 9,207,060 B2 | * | 12/2015 | Mraz et al. ............ B23H 11/00 |
| 2007/0006473 A1 | * | 1/2007 | Schopf et al. ......... G01B 5/012 33/558 |

FOREIGN PATENT DOCUMENTS

| | | | |
|---|---|---|---|
| EP | 1004846 A2 | 5/2000 | |
| EP | 1128156 A1 | 8/2001 | |
| EP | 1953497 A1 | 8/2008 | |
| EP | 2479531 A1 | 7/2012 | |
| JP | S59-501875 A | 11/1984 | |
| JP | H05-057606 A | 3/1993 | |
| JP | 2000-035325 A | 2/2000 | |
| JP | 2000-221024 A | 8/2000 | |
| JP | 2003-042750 A | 2/2003 | |
| JP | 2006-090945 A | 4/2006 | |
| JP | 2008-185535 A | 8/2008 | |
| JP | 2009-080102 A | 4/2009 | |
| JP | 2013104721 A * | 5/2013 | ............... G01B 5/06 |
| TW | 201239315 A1 | 10/2012 | |
| TW | 201243274 A1 | 11/2012 | |
| WO | 2005/015121 A1 | 2/2005 | |
| WO | 2010/146266 A1 | 12/2010 | |
| WO | 2012/098353 A1 | 7/2012 | |
| WO | 2012/098355 A1 | 7/2012 | |

OTHER PUBLICATIONS

Dec. 2, 2014 Office Action issued in Taiwanese Patent Application No. 102141319.
Apr. 15, 2013 Search Report issued in European Patent Application No. 12250176.
Apr. 15, 2013 Written Opinion issued in European Patent Application No. 12250176.0.
Feb. 11, 2014 International Search Report issued in International Patent Application No. PCT/GB2013/052884.
Feb. 11, 2014 Written Opinion issued in International Patent Application No. PCT/GB2013/052884.
Nov. 2, 2016 Office Action issued in Chinese Application No. 201380058806.X.
Jul. 4, 2017 Office Action issued in Japanese Patent Application No. 2015-542350.
Jul. 21, 2017 Office Action issued in Taiwanese Patent Application No. 102141319.
Feb. 7, 2018 Office Action issued in European Patent Application No. 13786744.6.
Sep. 4, 2017 Office Action issued in Chinese Patent Application No. 201380058806.X.
Mar. 9, 2018 Office Action issued in Chinese Patent Application No. 201380058806.X.
Jun. 5, 2018 Office Action issued in Japanese Patent Application No. 2015-542350.

* cited by examiner

METHOD AND APPARATUS FOR MEASURING A PART

This invention relates to a method and apparatus for measuring a part, in particular for scanning a part on a machine tool apparatus.

It is known to inspect parts during and after manufacture of the part, whilst the part is still located in the machine tool apparatus. Such inspection includes measurement of the part using a contact measurement probe such as that described in WO2012/098355. The operating environment of a machine tool apparatus is often full of coolant, swarf and other contaminants which are used or are produced during the machining of a part within the machine tool. Measurement probes, including measurement probes are stored within the machine tool such that they can be brought into measure the object.

It is known to mount a measurement probe in a machine tool spindle, for movement with respect to a workpiece, in order to measure the workpiece. In practice, especially in the case of machine tools, the probe has typically been a touch trigger probe, e.g. as described in U.S. Pat. No. 4,153,998 (McMurtry), which produces a trigger signal when a stylus of the probe contacts the workpiece surface, and used to take discrete single point measurements with each touch of the probe with the workpiece. This trigger signal is taken to a so-called "skip" input of the machine tool's numeric controller (NC). In response, relative movement of the object and workpiece are stopped and the controller takes an instantaneous reading of the machine's position (i.e. the position of the spindle and the probe relative to the machine). This is taken from measurement devices of the machine such as encoders which provide position feedback information in a servo control loop for the machine's movement. A disadvantage of using such a system is that the measurement process is relatively slow resulting in long measurement times if a large number of measurement points are required.

Analogue measurement probes (also commonly known as scanning probes) are also known. Contact analogue/scanning probes typically comprise a stylus for contacting the workpiece surface, and transducers within the probe which measure the deflection of the stylus relative to the probe body. An example is shown in U.S. Pat. No. 4,084,323 (McMurtry). In use, the analogue probe is moved relative to the surface of the workpiece, so that the stylus scans the surface and continuous readings are taken of the outputs of the probe transducers. Combining the probe deflection output and the machine position output allows co-ordinate data to be obtained thereby allowing the position of the workpiece surface to be found at a very large number of points throughout the scan. Analogue probes thus allow more detailed measurements of the form of the workpiece surface to be acquired than is practically possible using a touch trigger probe. As will be understood, during such scanning operations, the probe (e.g. the stylus, e.g. the stylus tip) is continually sliding against the surface of the workpiece.

Styli often comprise a stylus tip which is intended for contact with the workpiece/artefact during measurement. Typically, the stylus tip is spherical and manufactured to a high precision and calibrated to ensure a controlled diameter, which can be important for ensuring accuracy of measurements obtained using the stylus. Changes in the shape/dimensions of the stylus tip, even small changes at the micron level, can have a significant adverse impact of the accuracy of measurements obtained.

As suggested in WO2005/015121, it has been found that scanning with contact probes can result in three phenomena that may impact upon the metrological performance of the probe/stylus/stylus tip:
1. abrasive wear;
2. debris generation and/or collection;
3. adhesive wear (also referred to as pick up).

Abrasive wear results in the form of the scanning stylus tip being altered as material is removed from it during a scanning operation. Debris generation and collection results in free or loosely adhered particles on the surface of the stylus tip or part under inspection. Adhesive wear (pick up) occurs when material from a part being inspected adheres to the stylus tip. It is different from debris generation/collection, in that the material is quite strongly adhered (e.g. it can become chemically bonded with the material of the stylus tip) and the build up is localised in the region of the contact area of the stylus. This is especially the case when measuring freshly machined metals such as aluminium where an oxidization layer has not yet fully formed on the surface.

All three types of wear/pickup can affect the shape/size of the stylus tip and therefore adversely affect the accuracy of a measurement operation. Adhesive wear has been found to be particularly problematic when scanning along the surface of a part and can reduce the lifetime of a stylus to only a few meters. This is especially the case with machine tools because the probes designed for machine tools can have higher stylus spring forces (e.g. to cope with the relatively larger vibrations and forces the probes are exposed to compared to coordinate measuring machines CMMs), and also (as mentioned above) because often the part is measured soon after machining and before an oxidisation layer has had time to form on the surface.

The present invention provides an improved method for inspecting an artefact on a machine tool using a measurement probe, which comprises creating, during measurement, a flow of fluid at the point of contact between the measurement probe and artefact.

According to a first aspect of the invention there is provided a method of inspecting an artefact on a machine tool comprising: scanning a probe mounted on the machine tool along the surface of the artefact to be inspected to obtain/collect measurement data; characterised in that the method comprises supplying a flow of fluid at least at the point of interaction between the probe and the artefact during said scanning.

Supplying a flow of fluid has been found to dramatically increase the lifespan of the probe/stylus/stylus tip (in our experiments, we have managed to increase the lifespan of the probe/stylus/stylus tip from 10 m (meters) to 20 km (kilometers), an increase of 2000 times). Such an effect can be down to the lubricating effect of the flow of fluid. Furthermore, we have found that there is no adverse affect on the measurement accuracy. Indeed, due to significantly reduced wear and pickup, in particular adhesive wear, the accuracy of a scanning operation can be increased.

As will be understood, at least one fluid flow device can provide the flow of fluid. The fluid flow device could comprise a device for imparting a flow of the fluid already and/or naturally within the machine tool's operating environment so as to cause the flow of fluid at the point of interaction between the probe and the artefact. For instance, the fluid flow device could comprise a fluid displacement device, such as a fan, for moving the fluid (e.g. a gas such as air) within the machine tool's operating environment.

The fluid flow device can comprise at least one outlet, for example an outlet via which fluid leaves the fluid flow device, so as to cause the flow of fluid at the point of interaction between the probe and the artefact. The outlet could comprise at least one opening, a porous member, a perforated member, and/or a fluid permeable membrane or the like, via which fluid can be introduced into the machine tool's operating environment.

The fluid flow device can comprise at least one outlet via which fluid is introduced into the machine tool's operating environment so as to cause the flow of fluid at the point of interaction between the probe and the artefact.

The fluid flow device can be directional. In particular, the fluid flow device can have at least one nozzle or the like which can be used to direct fluid. The fluid can be directed by at least one fluid flow device toward the point of interaction between the probe and the artefact during said scanning. The fluid could be directed directly at the point of interaction between the probe and the artefact. The fluid could be directed by the at least one fluid flow device to the vicinity of the point of contact between the probe and the artefact. Optionally, the fluid can be directed by the at least one fluid flow device at a point separate from the actual point of interaction between the probe and the artefact during said scanning, but sufficiently close so as to cause a flow of fluid at least at the point of interaction between the probe and the artefact during said scanning.

The fluid flow device could comprise at least one fluid reservoir for storing fluid for use with the method of the invention. The fluid flow device could comprise at least one pump for supplying fluid from the fluid reservoir to at least one outlet. The fluid flow device could comprise at least one fluid conditioner, which is used during the method of the invention to condition the fluid used. The fluid conditioner could comprise at least one filter which is configured to remove contaminants from the fluid during the method of the invention. The fluid conditioner could comprise at least one temperature regulator for controlling the temperature of the fluid during the method of the invention, for instance within a predetermined range of a predetermined temperature.

The probe could comprise at least a part of the fluid flow device. For instance, the probe could comprise at least one outlet from which fluid is introduced to the operating environment so as to create the flow of fluid at the point of interaction between the probe and the artefact. For example, the probe could comprise at least one nozzle from which fluid is ejected, for instance toward the vicinity of, for example directly at, the point of contact between the probe and the artefact. Optionally, the probe could comprise at least one perforated or porous component via which the fluid is introduced into the machine tool's operating environment so as to cause a flow of fluid at the point of interaction between the probe and the artefact. For instance, the probe could comprise a stylus extending from a probe body. The stylus may comprise a tip which is intended for contacting the artefact during a measurement operation. The stylus and/or the stylus tip may be perforated and/or porous. Accordingly, this can facilitate the egress of fluid into the machine tool's operating environment so as to cause a flow of fluid at the point of interaction between the probe and the artefact. Accordingly, a conduit may need to be provided to supply fluid to the stylus and/or stylus tip. This could be provided within the probe itself, for instance in the stylus. The probe could comprise at least one fluid reservoir for storing fluid for use with the method of the invention. The probe could comprise at least one conduit for passing fluid to the at least one outlet of the fluid flow device.

Optionally, the fluid flow device is independent to the probe. Accordingly, any outlet, reservoir, conduit and any other associated components could be provided independently/separate from the probe. This can mean that the invention can be used with standard, known probes. Accordingly, all components of the fluid flow device could be provided on parts of the machine tool separate to the probe.

As will be understood, relative movement between the artefact and probe is required in order to cause the probe to scan the artefact. The artefact could be configured to move whilst the probe remains stationary within the machine tool. For instance, the machine tool could be configured to move the artefact in at least one dimension, optionally at least two mutually perpendicular dimensions, for instance at least three mutually perpendicular dimension. The machine tool could be configured to move the artefact in at least one rotational degree of freedom (e.g. about at least one axis), optionally two rotational degrees of freedom (e.g. about at least two mutually perpendicular axes), for instance three rotational degrees of freedom (e.g. about at least three mutually perpendicular axes). Accordingly, the artefact could be configured to move within the machine tool's operating environment.

Optionally, at least some of the relative movement, and optionally all relative movement, could be effected by movement of the probe. For instance, the machine tool could be configured to move the probe in at least one dimension, optionally at least two mutually perpendicular dimensions, for instance at least three mutually perpendicular dimension. The machine tool could be configured to move the probe in at least one rotational degree of freedom (e.g. about at least one axis), optionally two rotational degrees of freedom (e.g. about at least two mutually perpendicular axes), for instance three rotational degrees of freedom (e.g. about at least three mutually perpendicular axes). Accordingly, the probe could be configured to move within the machine tool's operating environment.

Accordingly, the method could comprise moving the artefact to effect relative movement between it and the probe and/or moving the probe to effect relative movement between it and the artefact, in any of the manners described above.

The method could comprise moving at least a part of the fluid flow device, such as its at least one outlet, during said scanning. The method could comprise causing at least a part of the fluid flow device, such as its at least one outlet, to follow any movement of the probe, at least during said scanning. The method could comprise maintaining a constant positional and/or orientational relationship between at least a part of the fluid flow device, e.g. its at least one outlet, and the probe during said scanning. This could be so as to maintain a constant direction of the fluid leaving the fluid flow device (e.g. leaving its at least one outlet) relative to the point of interaction between the probe and the artefact during said scanning. This could be achieved by the probe comprising the at least one outlet. Optionally, the at least one outlet could be mounted to a part of the machine tool which effects movement of the probe. Accordingly, the fluid flow device can comprise at least one outlet (e.g. from which fluid is projected) attached to a part of the machine tool which moves with movement of the probe. For instance, the at least one outlet could be mounted to a spindle of the machine tool to which the probe is mounted during said scanning and/or a carriage which effects movement of the spindle.

As will be understood, more than one outlet could be provided. In this case, only one, some, or all of them could be configured to move within the machine tool's environment in any of the manners described above. For instance, one or more may be fixed within the machine tool's operating environment and one or more may be moveable within the machine tool's operating environment.

The machine tool can comprise a coolant system for supplying coolant to cool machine tool bits during a machining operation. The method can comprise the machine tool's coolant system supplying said flow of fluid during said scanning. The machine tool's coolant system could comprise a filter for filtering contaminants from the coolant. The machine tool can comprise two or more coolant systems. At least one could be used during the machining of the workpiece and at least one other coolant system could be used during the measuring of the workpiece. The two or more coolant systems could comprise separate coolant reservoirs and optionally use different coolant.

The fluid can be a liquid. The liquid can be coolant. The fluid can be fluid that is used by the machine tool during a machining operation. For example, the fluid/liquid can be coolant used by the machine tool during a machining operation. The coolant can be water-based coolant, oil-based coolant, or indeed any of a variety of liquids or emulsions typically used on machine tools. Preferably the liquid provides lubrication between the point of interaction between the probe and the artefact.

The fluid can be a gas. The fluid flow device could comprise a compressed gas source. The fluid could be a combination of liquid and gas. The fluid could be a mist.

The probe can be a measurement probe, in particular a dimensional measurement probe (i.e. a probe for obtaining dimensional measurements). The probe can comprise a deflectable stylus for contact with the artefact. The deflectable stylus could be deflectable in one dimension, for example in two mutually perpendicular dimensions, for example in three mutually perpendicular dimensions. As mentioned above, the stylus can comprise a stylus tip which is intended for contacting the artefact during said scanning. The stylus tip can be spherical. The probe can detect and/or measure stylus deflection in at least one dimension, two mutually perpendicular dimensions, for example in at least three mutually perpendicular dimensions. Optionally, the probe can monitor the extent of stylus deflection and provide and/or change an output signal when deflection matching predetermined criteria, is detected e.g. beyond a predetermined threshold, for instance above or below a predetermined threshold, (or even for example when the signal goes outside a predetermined tolerance band (e.g. defined by upper and lower thresholds)) or for example when a predetermined deflection signature is detected. The probe can be configured to output a measure of the extent of deflection of the stylus. The probe can output an individual measure for each dimension in which it detects deflection. Optionally, the probe can provide an aggregated measurement for at least two of the dimensions in which it can measure, optionally at least three dimensions.

Accordingly, as will be understood, the probe could be what is commonly referred to as a touch-trigger probe or could be what is commonly referred to as a scanning probe (also known as an analogue probe).

The method can comprise loading the probe in a spindle of the machine tool. As will be understood, a spindle is the part of a machine tool in which a tool bit can be loaded during a machining operation in order to machine an artefact. Accordingly, the method can comprise loading the probe in a spindle of the machine tool in place of a machine tool bit. The method can comprise machining the artefact, e.g. using a tool bit mounted in the spindle. Said machining could be done before, during and/or after said scanning. Said machining can comprise at least one fluid flow device directing fluid, for example liquid, in particular for example coolant, toward the tool bit. The fluid flow device used during said machining can be the same fluid device used during said scanning.

According to another aspect of the invention there is provided an apparatus for inspecting an artefact comprising: a machine tool; a probe mounted on the machine tool; a fluid flow device; in which the apparatus is configured such that during a measurement operation in which the probe is scanned along the surface of an artefact in the machine tool, the fluid flow device is operated to cause a flow of fluid at least at the point of interaction between the probe and the artefact.

According to a further aspect of the invention there is provided a method of inspecting an artefact on a machine tool comprising: scanning a probe mounted on the machine tool along the surface of the artefact to be inspected to obtain measurement data; characterised in that at least the part of the artefact that is being inspected during said scanning is submerged within a liquid.

According to a yet further aspect of the invention there is provided a method of inspecting an artefact on a machine tool comprising: using a probe mounted on the machine tool to inspect an object to obtain measurement data; characterised in that the method comprises passing liquid through the probe, e.g. during the inspection of the artefact.

According to another aspect of the invention there is provided an apparatus comprising a machine tool, and a probe mounted on the machine tool for inspecting an artefact, the probe comprising at least one liquid conduit, and the apparatus comprising a liquid flow device for providing a flow of liquid through the probe. The liquid flow device could be provided external to the probe.

Likewise, according to another aspect of the invention there is provided a probe for inspecting an object characterised in that the probe comprises at least one liquid conduit through which liquid can be passed, for example passed during an inspection operation.

The probe can be a touch-trigger type probe or a scanning type probe. The probe can be a contact probe or a non-contact probe (e.g. an optical measurement probe).

As will be understood, the features described above in connection with the first aspect of the invention are also relevant to these other embodiments. For example, the probe could comprise at least one conduit exit through which liquid in the conduit can exit the probe into the environment in which the probe is being used, (e.g. onto the artefact being inspected). The at least one conduit exit could be provided in the probe body, stylus and/or stylus tip. The probe could comprise a liquid reservoir. Optionally, the at least one liquid conduit comprises at least one conduit entrance through which liquid is supplied to the probe. The at least one conduit entrance/exit could comprise at least one opening, hole, perforated and/or porous member.

In line with embodiments described above, the liquid could be temperature controlled. In line with embodiments described above, the liquid could be coolant. The liquid (e.g. coolant) could be supplied by a liquid flow device/supply system used during machining of the artefact (e.g. a coolant system).

Embodiments of the invention will now be described with reference to the following drawings in which.

Figure 1:
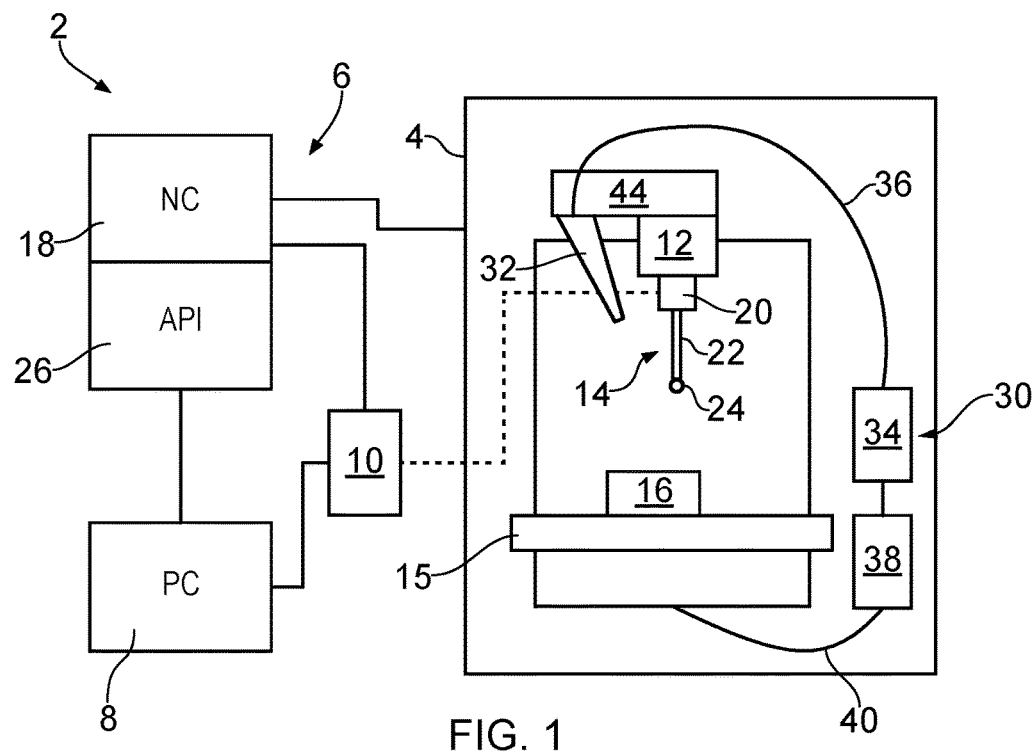
FIG. 1 is a schematic diagram showing the system architecture for a machine tool.

Referring to FIG. 1, there is shown a machine tool apparatus 2 comprising a machine tool 4, a controller 6, a PC 8 and a transmitter/receiver interface 10. The machine tool 4 comprises motors (not shown) for moving a spindle 12 (which during a machining operation holds a machine tool bit (e.g. a drill bit) but as shown in FIG. 1, during a measuring operation can hold a probe such as an analogue probe 14 (also known as a scanning probe) relative to a workpiece 16 located on a table 15. The location of the spindle 12 (and hence the analogue probe 14) is accurately measured in a known manner using encoders (not shown) or the like. Such measurements provide spindle position data defined in the machine co-ordinate system (x, y, z). A numerical controller (NC) 18 (which is part of the controller 6) controls x, y, z movement of the spindle 12 within the work area of the machine tool and also receives data relating to the spindle position.

As will be understood, in alternative embodiments relative movement in any or all of the x, y and z dimensions could be provided by movement of the table 15 relative to the spindle 12. Furthermore, relative rotational movement of the analogue probe 14 and workpiece 16 could be provided by a part of the spindle 12 (e.g. a rotating/articulated head mounted on the spindle 12) and/or a part of table 15 (e.g. a rotary table). Furthermore, movement might be restricted to fewer dimensions, e.g. only x, and/or y. Further still, the embodiment described comprises a cartesian machine tool, whereas it will be understood this need not necessarily be the case and could be for instance a non-cartesian machine tool. Further still, many other different types of machine tools, including lathes, and parallel-kinematic machines, and robot arms are known and could be used with the invention.

In the embodiment described, the analogue probe 14 is a contact analogue probe which comprises a probe body 20, a workpiece contacting stylus 22 extending from the probe body 20, and has a surface detection region in the form of a workpiece contacting tip 24 (which in this case is in the form of a spherical stylus ball) at the distal end of the stylus 22. The analogue probe 14 measures deflection of the stylus 22 in a probe geometry system (a, b, c). (However, as will be understood, this need not necessarily be the case, and for instance the analogue probe could measure deflection in only 1 or 2 dimensions, or even provide an output indicative of the extent of deflection, without any indication of the direction of deflection). The probe 14 also comprises a transmitter/receiver (not shown) that wirelessly communicates with the transmitter/receiver interface 10 (e.g. via a radio, optical or other wireless transmission mechanism). Such a probe for a machine tool, for use with the present invention, is described in more detail in WO2012/098355.

In line with many conventional machine tools, during a measuring operation, the NC 18 controls the relative movement of the analogue probe 14 and the workpiece 16. Measurement data regarding the x, y, z location of the spindle 12/analogue probe 14 (received from encoders measuring the position of the machine tool's x, y, z axes (and any rotary axes)) is combined with stylus deflection data (received from the analogue probe 14 via the wireless transmitter/receiver interface 10) so as to provide workpiece measurement data.

In line with the present invention, a flow of fluid is provided at least at the point of interaction between the contact analogue probe and the artefact during said scanning. This can be implemented in many different ways as explained below.

Figure 2:
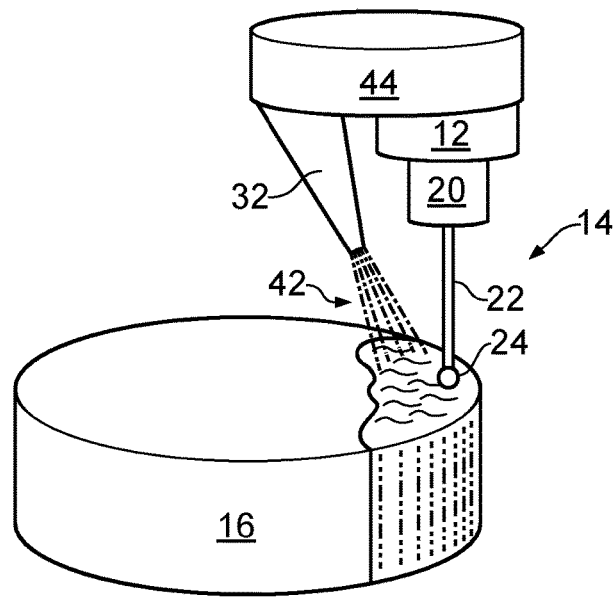
FIG. 2 is a schematic diagram illustrating a first way of implementing the invention, using coolant from the machine tool's coolant system.

Referring first to FIGS. 1 and 2 there is shown the nozzle 32 of a coolant system 30. As is typically the case with many machine tools 4, a coolant system 30 is provided which is configured to supply coolant to the machine tool bit (not shown) loaded into the spindle 12 during a machining operation so as to avoid the machine tool bit overheating as well as to help remove swarf and other debris from the machining site during operation. The coolant system comprises a reservoir 34 of coolant which is pumped to the nozzle 32 via a first conduit 36 to be sprayed toward the point of interaction between a machine tool bit and the workpiece during a machining operation. Used coolant falls to the bottom of the machine tool 4 which is then returned to a conditioning system 38 via a second conduit 40. In the described embodiment, the conditioning system 38 filters swarf and other contaminants from the coolant and also conditions the temperature of the coolant so that it is controlled to be within a predetermined range of a predetermined temperature, before returning the coolant to the reservoir 34. As will be understood, the conditioning system 38 could perform additional or alternative functions. Optionally, it might be that no conditioning system is required, and/or can be bypassed.

In the embodiment described, the nozzle 32 and spindle 12 are both fixed to a common carriage 44, the movement of which can be effected by motors (not shown) under the control of the NC 18 (and the position of which can be determined via encoders (not shown) and reported to the controller 6). Accordingly, the nozzle 32 and spindle 12 move together such that the nozzle 32 is always directing coolant toward whatever is loaded into the spindle 12. This need not necessarily be the case and for instance the nozzle 32 could be independently moveable with respect to the spindle 12. In this case it could be provided on its own moveable carriage and could be configured to follow the spindle 12. Optionally, the nozzle 32 could be fixed stationary within the machine tool 4. Furthermore, as will be understood, multiple nozzles (and indeed multiple separate coolant systems) could be provided; one, some, or all of which could be configured to be fixed to move with the spindle 12, and/or be independently moveable relative to the spindle 12, and/or be fixed stationary within the machine tool 4, or any combination thereof. The nozzle 32 can be rigid, or can be flexible such that its projection direction can be changed by a user bending the nozzle 32.

Our inventors have found that the same coolant system 30, and even the same coolant, used for cooling machine tool bits during a machining operation can be used to significantly reduce the problem of wear and debris pickup associated with scanning measurement operations using contact analogue probes, and hence increase the working life span of the contact analogue probe/stylus/stylus tip, for instance by as much as 2000 times. For example, our experiments have shown that the working life span of the stylus tip can be increased from a typical distance of 10 m (meters) to 20 km (kilometers).

Accordingly, as illustrated in FIG. 2, the coolant system 30 can be operated such that coolant 42 can be ejected from the nozzle 32 whilst the analogue probe 14 is scanned along workpiece 16, with the stylus tip 24 in contact with the surface of the workpiece 16, so as to collect measurement data. Such spraying of the coolant 42 causes a flow of coolant at the point of interaction between the stylus tip 24 and the workpiece 16 which has been found to significantly reduce wear and pickup, in particular the above described adhesive wear.

Figure 3:
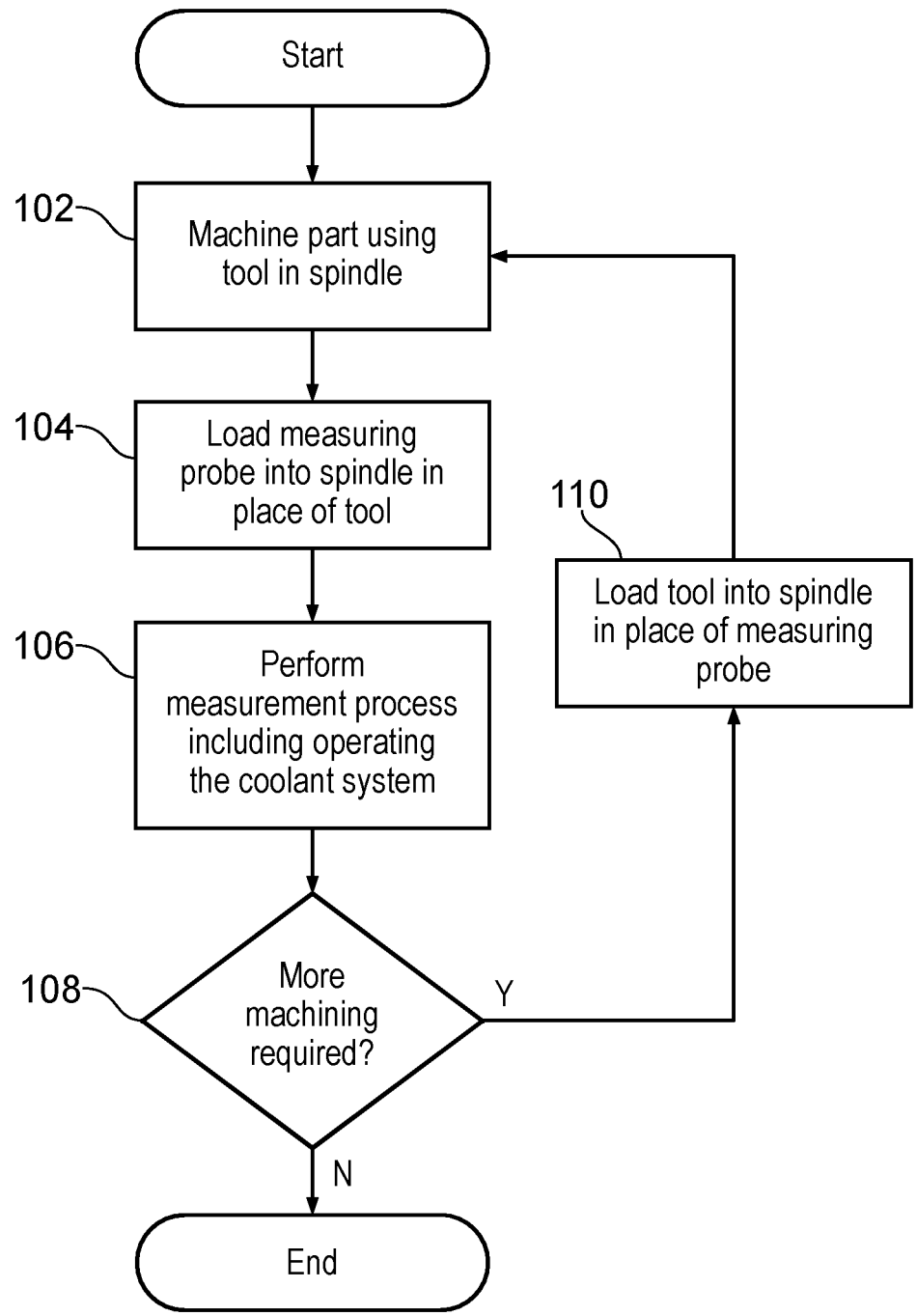
FIG. 3 is a flow diagram illustrating the steps involved in an example process within which the invention might be used.

FIG. 3 illustrates an example process 100 within which the method of the invention might be used. The process begins at step 102 at which a machining operation is performed to shape a workpiece using a machine tool bit in the machine tool's spindle 12. This could involve performing a complete machining operation so as to machine the workpiece to an intended finished state, or only part of a machining operation such that subsequent machining steps are intended/needed to complete the final shape of the workpiece. As will be understood, the machining operation can be executed under the control of a program loaded into the NC 18. Once the machining operation of step 102 has finished, the analogue probe 14 is loaded into the machine tool's spindle 12 in place of the machine tool bit. This can be done automatically under the control of the NC 18. Again, under the control of a program loaded into the NC 18, a measuring process is initiated and performed at step 106, which involves controlling relative movement of the analogue probe 14 and the workpiece 16 so as to cause the stylus tip 24 to be dragged along the surface of the workpiece, causing deflection of the stylus relative to the probe body 20. The extent of deflections are recorded are reported to the controller 6 via the interface 10 and then combined with the spindle 12/analogue probe 14 position information (e.g. in the controller 6 and/or PC 8). This step 106 in the process also involves simultaneously operating the coolant system 30 so as to create a flow of coolant at the point of interaction between the stylus tip 24 and the workpiece 16, as well as at least in the region immediately surrounding the point of interaction. The coolant 42 could be continuously pumped, or optionally intermittently pumped, so as to create the flow of coolant 42 at the point of interaction between the stylus tip 24 and workpiece 16 during the scanning measurement operation. Once the measuring operation has been completed, it is determined at step 108 if any further machining is required. Further machining might be required if only part of a complete machining process has been executed so far, and/or if the measurements obtained during the measuring process 106 indicate that additional machining is required in order for the workpiece 16 to conform to predetermined requirements. If more machining is required, then a machine tool bit is loaded into the machine tool's spindle 12 at step 110 and then control proceeds back to step 102. If no more machining is required, then the process ends.

In the above described embodiment, coolant is used as the liquid to create the flow of fluid at the point of interaction between the stylus tip 24 and workpiece 16. However, this need not necessarily be the case and liquid other than coolant could be used, for example a lubricating oil, or water. Furthermore, the system for supplying the liquid/coolant during the measuring process need not be the same coolant system 30 used during a machining operation. Further still, a gas could be used instead of a liquid.

Figure 4A:
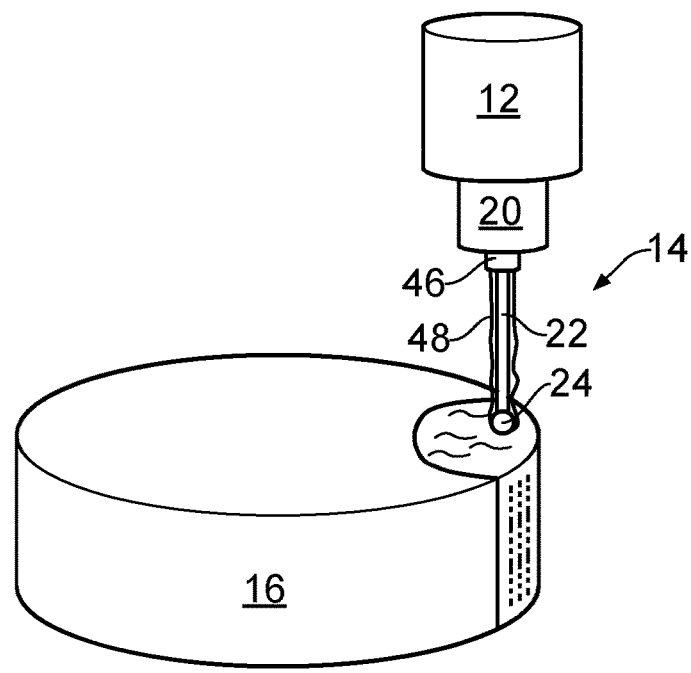
FIGS. 4a and 4b are schematic diagrams illustrating alternative ways of implementing the invention, using liquid supplied from a reservoir provided by the probe.
Figure 4B:
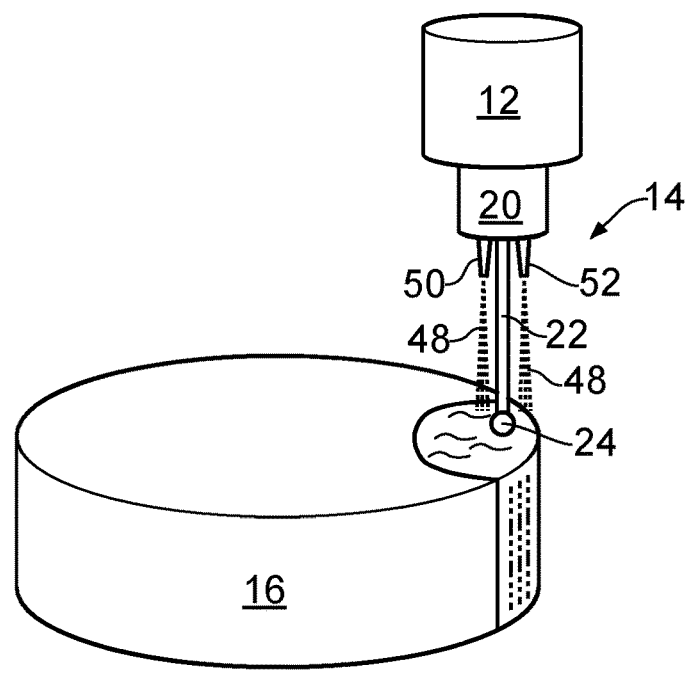

Examples of alternative ways of implementing the invention are described in connection with the other Figures. For instance, as illustrated in FIGS. 4a and 4b liquid can be supplied to the point of interaction between the stylus tip 24 and the workpiece 16 via the analogue probe 14. For instance, in FIG. 4a, the probe 24 could comprise its own reservoir 46 of liquid which during a measurement operation releases liquid 48 such that it flows down the stylus 22 and the tip 24 toward the workpiece 16. As illustrated in FIG. 4b, the analogue probe 14 could comprise one or more nozzles 50 which can be used to spray liquid 48 toward the point of interaction between the stylus tip 24 and the workpiece 16. The liquid 48 could be stored in a reservoir within the probe 14. Optionally, in the embodiments of FIGS. 4a and 4b, the liquid 48 could be stored within a reservoir external to the analogue probe 14 and supplied to the analogue probe 14 via a conduit. The reservoir could be the coolant system's reservoir 34. In this case the conduit could pass through the spindle 12 and analogue probe 14.

Figure 5:
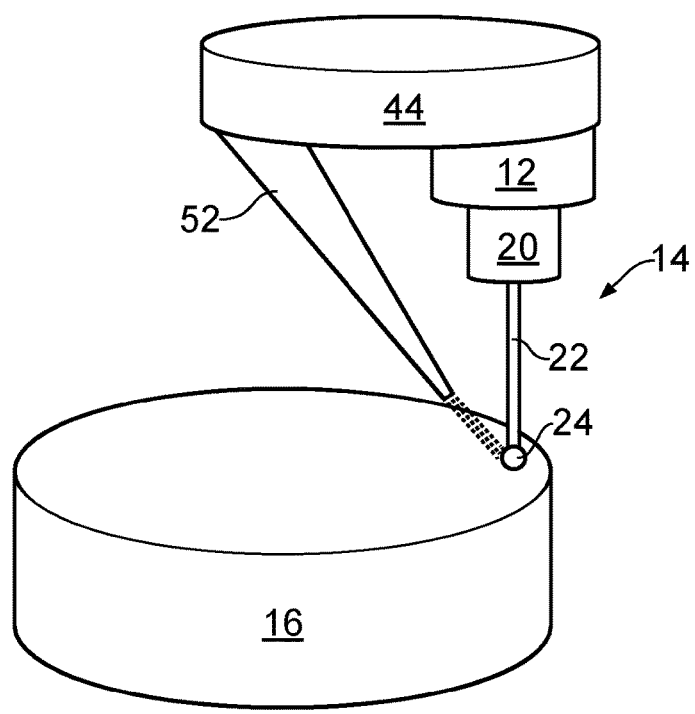
FIG. 5 is a schematic diagram illustrating a further way of implementing the invention, using a flow of gas as opposed to liquid.

In the above described embodiments, liquid is used to create the flow of fluid at the point of interaction between the stylus tip 24 and the workpiece 16. However, this need not necessarily be the case. For instance, fluid in the form of a gas, including for instance a mist (e.g. a gas comprising liquid suspended within it), could be used instead. For instance, as shown in FIG. 5, a nozzle 52 for directing a flow of gas or mist toward the point of interaction between the stylus tip 24 and the workpiece 16 could be attached to the carriage 44. (As will be understood, like with the nozzle 32 of the embodiment of FIG. 2, more than one nozzle could be provided, and the nozzle(s) could be fixed relative to the spindle 12, independently moveable relative to the spindle 12, fixed relative to the machine tool, or any combination thereof if there are multiple nozzles). The nozzle 52 could comprise a device, such as a pump or a fan, to impart a flow of the gas within the machine tool's environment toward the region of the point of interaction between the stylus tip 24 and the workpiece 16. Optionally, a source of gas, such as a canister of compressed gas could be provided and the nozzle connected to the gas source and configured to direct gas therefrom toward the point of interaction between the stylus tip 24 and the workpiece 16.

In the above described embodiments of FIGS. 2, 4b and 5, the nozzle(s) could be configured such that the fluid they eject is directed directly toward the point of contact between the analogue probe 14 and the workpiece 16. Optionally, the nozzle (or at least one of the nozzle where there are multiple nozzles) could be directed at a point remote from the point of contact between the analogue probe 14 and the workpiece 16, but still sufficiently close so as to provide a flow of fluid at the point of contact.

Figure 6:
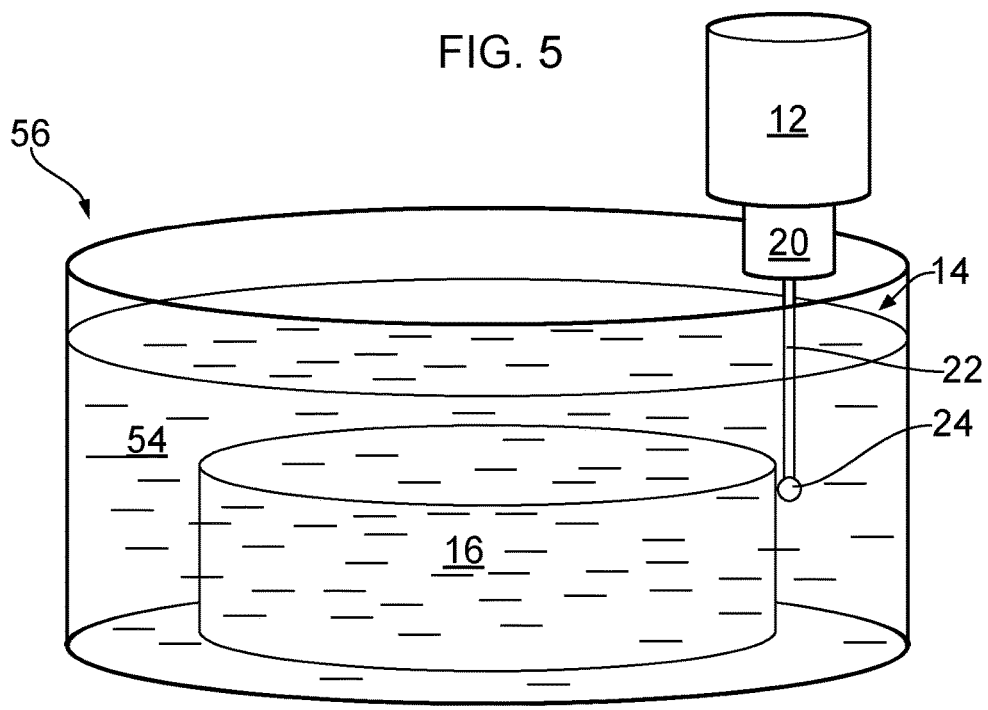
FIG. 6 is a schematic diagram illustrating an alternative solution which involves scanning the artefact whilst it is at least partially submerged in liquid.

An alternative embodiment described herein is shown in FIG. 6. In this case, rather than supplying a flow of fluid at the region of the point of interaction between the stylus tip 24 and the workpiece 16, the workpiece 16 is immersed in a liquid 54 such as water, coolant (e.g. machine tool coolant, for example, as that used during the machining of the workpiece), oil held in a container 56. It might be that the workpiece 16 was machined whilst being immersed in liquid (optionally the same liquid 54) or it might be that the workpiece 16 is immersed in the liquid 54 after the machining step and before the measuring step. The analogue probe 14 is then used to scan along the surface of the workpiece 16 so as to collect measurement data about the workpiece 16. This technique has also been found to significantly reduce adverse wear and pickup such as adhesive wear, and hence significantly increase the lifespan of the analogue probe. As will be understood, an example process within which this technique can be used will be very much similar to that shown in FIG. 3, except that step 106 will involve performing the measurement operation with the workpiece 16 immersed in liquid.

In the embodiment of FIG. 6, the workpiece 16 is fully immersed. However, this need not necessarily be the case. For instance, the workpiece could only be partly immersed, with the part of the workpiece 16 that is being measured being immersed at the time that the analogue probe 14 contacts that part of the workpiece 16.

As will be understood, the machine tool, probe, control system and their various associated components are highly schematically illustrated in order to aid clarity of the description of the invention, and it will be understood that various additional and/or alternative components could be provided.

In the above described embodiments the probe is an analogue (or scanning) probe, but this need not necessarily be the case. For instance the probe could be a touch-trigger probe that is scanned around the surface of the workpiece (e.g. to see if it deflects/triggers which could be used to indicate imperfections in the workpiece).

As shown in the embodiment of FIGS. 4(a) and (b), liquid could be passed through the probe. In this case, it has also been found that doing this could be useful in non-scanning type probes, such as discrete point measurement probes, such as touch-trigger probes (or "dual-state" probes). Passing the liquid through the probe can also be useful with non-contact probes. Furthermore, benefits could be achieved by passing liquid through the probe, but without the liquid entering the probe's operating environment (e.g. without being passed out of the probe onto the artefact being measured). For instance the liquid could just be circulated through the probe, for instance for temperature controlling purposes. In this case, a return path for fluid that has been passed through a conduit in the probe back to the conditioning system 38 and/or reservoir 34 can be provided through the machine tool apparatus.

The invention claimed is:

1. A method of inspecting an artefact on a machine tool comprising:
    scanning a probe mounted on the machine tool along a surface of the artefact to be inspected; and
    supplying a flow of fluid at least at the point of interaction between the probe and the artefact while scanning the probe along the surface of the artefact.

2. A method as claimed in claim 1, in which the fluid is directed by at least one fluid flow device toward the point of interaction between the probe and the artefact during said scanning.

3. A method as claimed in claim 2, in which the fluid is directed by the at least one fluid flow device at a point separate from the actual point of interaction between the probe and the artefact during said scanning, but sufficiently close so as to cause a flow of fluid at least at the point of interaction between the probe and the artefact during said scanning.

4. A method as claimed in claim 2, in which the fluid flow device is independent to the probe.

5. A method as claimed in claim 4, in which at least the fluid flow device comprises at least one outlet which follows movement of the probe at least during said scanning.

6. A method as claimed in claim 5, in which the at least one outlet is attached to a part of the machine tool which moves with movement of the probe.

7. A method as claimed in claim 1, in which the machine tool comprises a coolant system for supplying coolant to cool machine tool bits during a machining operation and in which the method comprises the coolant system supplying said flow of fluid during said scanning.

8. A method as claimed in claim 1, in which the fluid is a liquid.

9. A method as claimed in claim 1, in which the probe comprises a deflectable stylus for contact with the workpiece, and is configured to output a measure of the extent of deflection of the stylus.

10. An apparatus for inspecting an artefact comprising:
    a machine tool;
    a probe mounted on the machine tool;
    a fluid flow device;
    wherein, during a measurement operation in which the probe is scanned along a surface of a workpiece in the machine tool, the fluid flow device is operated to cause a flow of fluid at least at the point of interaction between the probe and the artefact.

* * * * *